US008468835B2

(12) United States Patent
DeMoss et al.

(10) Patent No.: US 8,468,835 B2
(45) Date of Patent: Jun. 25, 2013

(54) HYBRID GAS TURBINE ENGINE—ELECTRIC MOTOR/GENERATOR DRIVE SYSTEM

(75) Inventors: Steven Howard DeMoss, San Diego, CA (US); Robert Eleazar Mendoza, Poway, CA (US); Roy Thomas Collins, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 1125 days.

(21) Appl. No.: 12/413,088

(22) Filed: Mar. 27, 2009

(65) Prior Publication Data
US 2010/0242495 A1    Sep. 30, 2010

(51) Int. Cl.
*F02C 9/48* (2006.01)
*F02C 9/56* (2006.01)

(52) U.S. Cl.
USPC .............. 60/784; 60/773; 60/778; 60/783; 60/793; 60/801

(58) Field of Classification Search
USPC .............. 60/772, 773, 778, 783, 786, 793, 60/784, 796, 801
See application file for complete search history.

(56) References Cited

U.S. PATENT DOCUMENTS

| | | | |
|---|---|---|---|
| 4,160,362 A | | 7/1979 | Martens et al. |
| 4,539,303 A | * | 9/1985 | MacLean et al. ............... 502/39 |
| 5,218,824 A | * | 6/1993 | Cederwall et al. ............. 60/737 |
| 5,689,141 A | | 11/1997 | Kikkawa et al. |
| 5,974,781 A | * | 11/1999 | Correa et al. ................ 60/39.37 |
| 6,608,395 B1 | | 8/2003 | Steinway |
| 6,750,557 B2 | | 6/2004 | Poteet et al. |
| 6,784,565 B2 | | 8/2004 | Wall et al. |
| 6,812,586 B2 | * | 11/2004 | Wacknov et al. ............... 290/52 |
| 6,865,891 B2 | | 3/2005 | Walsh et al. |
| 6,877,307 B2 | | 4/2005 | Ryan et al. |
| 6,912,451 B2 | | 6/2005 | Poteet et al. |
| 6,931,856 B2 | | 8/2005 | Belokon et al. |
| 6,951,110 B2 | * | 10/2005 | Kang ............................ 60/772 |
| 6,960,840 B2 | | 11/2005 | Willis et al. |
| 7,042,111 B2 | | 5/2006 | Poteet et al. |
| 7,078,825 B2 | | 7/2006 | Ebrahim et al. |
| 7,131,259 B2 | | 11/2006 | Rollins, III |
| 7,185,495 B2 | | 3/2007 | Leachman et al. |
| 2002/0190695 A1 | | 12/2002 | Wall et al. |
| 2005/0172630 A1 | | 8/2005 | Althaus et al. |
| 2006/0030450 A1 | | 2/2006 | Kyle |
| 2006/0237247 A1 | | 10/2006 | Severinsky et al. |
| 2007/0089425 A1 | | 4/2007 | Motter et al. |
| 2007/0204623 A1 | | 9/2007 | Rollins, III |
| 2009/0277430 A1 | * | 11/2009 | Ernst et al. ................ 123/568.12 |

* cited by examiner

*Primary Examiner* — Phutthiwat Wongwian
*Assistant Examiner* — Steven Sutherland
(74) *Attorney, Agent, or Firm* — Finnegan, Henderson, Farabow, Garrett & Dunner LLP (57) ABSTRACT

A method of operating a drive system for a load is disclosed. The drive system may have an electric motor/generator and a gas turbine engine. The engine may have a combustor, and main and pilot flow paths via which fuel is supplied to the combustor. The engine may be operable in low and standard emissions modes. A proportion of the fuel that is supplied to the combustor via the pilot flow path may be greater in the standard emissions mode than in the low emissions mode. The method may include determining an engine power requirement of the load, and whether the engine power requirement of the load is sufficiently large to operate the engine in the low emissions mode. Additionally, the method may include operating the electric motor/generator if the engine power requirement of the load is not sufficiently large to operate the engine in the low emissions mode.

16 Claims, 4 Drawing Sheets

HYBRID GAS TURBINE ENGINE—ELECTRIC MOTOR/GENERATOR DRIVE SYSTEM

TECHNICAL FIELD

The present disclosure relates generally to a drive system and, more particularly, to a hybrid gas turbine engine—electric motor/generator drive system.

BACKGROUND

Gas turbine engines are sometimes used to power driven equipment. For example, gas turbine engines are sometimes used to power centrifugal compressors used in the oil and gas industry. In particular, the gas turbine engines are used to power centrifugal compressors used to transport fluids such as, for example, natural gas. Since demand for the fluids fluctuates, the gas turbine engines are not always sized to efficiently power the centrifugal compressors. For example, gas turbine engines that are sized to power the centrifugal compressors during peak demand periods are not sized to efficiently power the centrifugal compressors during low demand periods. Unfortunately, this leads to excessive fuel costs and emissions during low demand periods.

One way to reduce fuel costs is disclosed in U.S. Pat. No. 5,689,141 (the '141 patent) issued to Kikkawa et al. on Nov. 18, 1997. The '141 patent discloses a compressor drive system for a natural gas liquefaction plant. The compressor drive system includes a plurality of gas turbines. Additionally, the compressor drive system includes an electric motor associated with each of the gas turbines. Each electric motor serves both as an auxiliary electric motor for generating a startup torque and as an AC generator. When the power requirement of a compressor associated with one of the gas turbines is less than the power output of the gas turbine, the electric motor converts the excess output power of the gas turbine into electric power. This allows the gas turbine to operate efficiently, resulting in reduced operating costs through fuel savings.

SUMMARY

In one aspect, the present disclosure is related to a method of operating a drive system for a load. The drive system may include an electric motor/generator and a gas turbine engine. The engine may include a combustor, and main and pilot flow paths via which fuel is supplied to the combustor. The engine may be operable in a low emissions mode and a standard emissions mode. A proportion of the fuel that is supplied to the combustor via the pilot flow path may be greater in the standard emissions mode than in the low emissions mode. The method may include determining whether an environmental condition is conducive to operating the engine in the low emissions mode. The method may also include operating the electric motor/generator as a motor if the environmental condition is not conducive to operating the engine in the low emissions mode.

In another aspect, the present disclosure is related to another method of operating a drive system for a load. The drive system may include an electric motor/generator and a gas turbine engine. The engine may include a combustor, and main and pilot flow paths via which fuel is supplied to the combustor. The engine may be operable in a low emissions mode and a standard emissions mode. A proportion of the fuel that is supplied to the combustor via the pilot flow path may be greater in the standard emissions mode than in the low emissions mode. The method may include determining an engine power requirement of the load. The method may also include determining whether the engine power requirement of the load is sufficiently large to operate the engine in the low emissions mode. Additionally, the method may include operating the electric motor/generator if the engine power requirement of the load is not sufficiently large to operate the engine in the low emissions mode.

In yet another aspect, the present disclosure is related to a turbine-compressor unit. The turbine-compressor unit may include a centrifugal compressor. The turbine-compressor unit may also include a gas turbine engine, which may be coupled to the centrifugal compressor. The engine may include a combustor, and main and pilot flow paths via which fuel is supplied to the combustor. The engine may be operable in a low emissions mode and a standard emissions mode. A proportion of the fuel that is supplied to the combustor via the pilot flow path may be greater in the standard emissions mode than in the low emissions mode. In addition, the turbine-compressor unit may include an electric motor/generator, which may be coupled to the centrifugal compressor. The turbine-compressor unit may also include a controller, which may be in communication with the centrifugal compressor, the engine, and the electric motor/generator. The controller may be configured to determine an engine power requirement of the centrifugal compressor. Additionally, the controller may be configured to determine whether the engine power requirement of the centrifugal compressor is sufficiently large to operate the engine in the low emissions mode. The controller may also be configured to operate the electric motor/generator if the engine power requirement of the centrifugal compressor is not sufficiently large to operate the engine in the low emissions mode.

DETAILED DESCRIPTION

Figure 1:
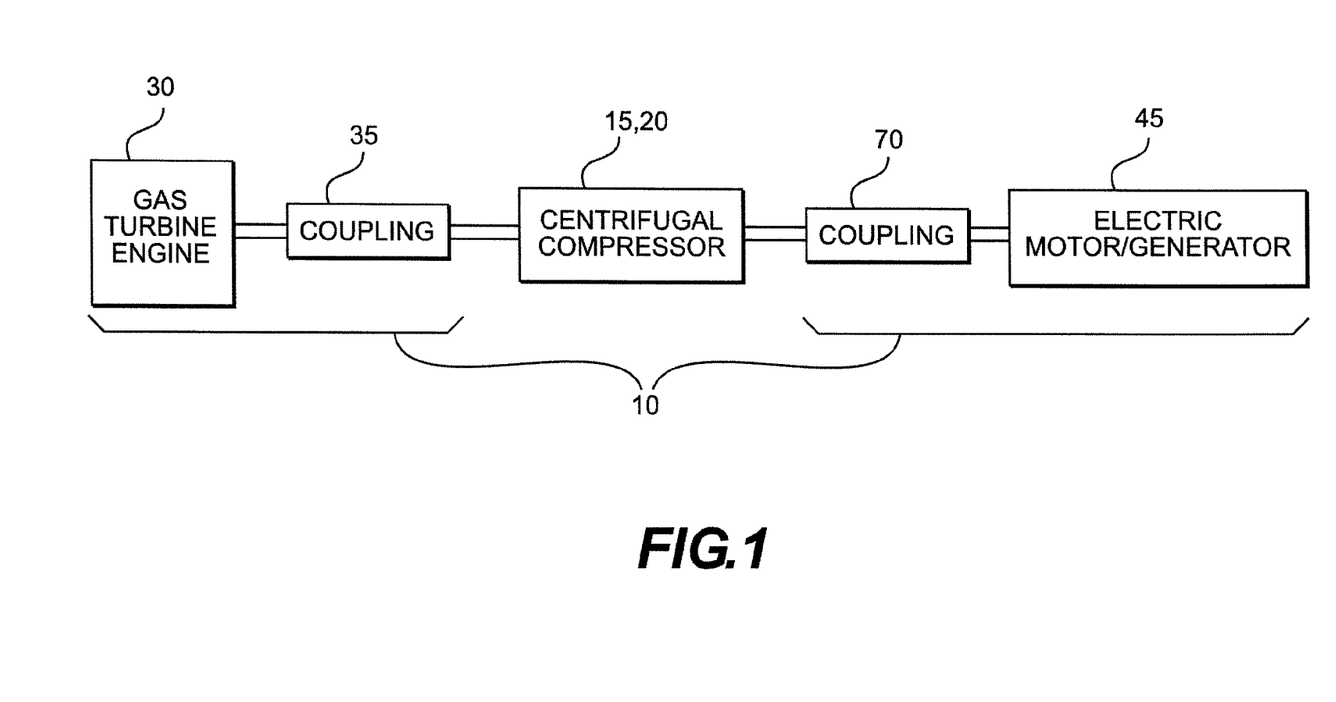
FIG. 1 is a block diagram of an exemplary disclosed drive system for an exemplary disclosed load.

FIG. 1 illustrates a drive system 10 for a load 15. For example, load 15 may include a centrifugal compressor 20, which may be used to compress, for example, natural gas or another fluid. Such an arrangement is hereafter referred to as a turbine-compressor unit. Alternatively, load 15 may include another type of compressor (not shown), a generator (not shown), or another type of load known in the art.

Regardless of the type of load 15, drive system 10 may include a gas turbine engine 30, which may provide power to load 15. Specifically, engine 30 may be mechanically coupled to load 15 by a coupling 35, and may rotatably drive load 15. For example, coupling 35 may include a clutch and/or a gearbox. Alternatively, engine 30 may be coupled directly to load 15 by, for example, a drive shaft. In any case, engine 30 may include a dry low emissions (DLE or DLN) combustion system (not shown). This combustion system may include multiple flow paths (not shown) that deliver different concentrations of fuel and air to a combustor of engine 30 (not shown).

For example, the combustion system may include a main flow path and a pilot flow path. The main flow path may deliver a premixed lean fuel-air mixture to the combustor (hereafter the "main fuel stream"). The main fuel stream may burn in the combustor, creating premixed flames. As used herein, premixed flames are flames created when fuel and air are first mixed, and then burned in the combustor. The pilot flow path may deliver to the combustor through a pilot air module a pressurized spray of fuel along with compressed air (hereafter the "pilot fuel stream"). The pilot fuel stream may burn in the combustor, creating a diffusion flame. As used herein, diffusion flames are flames created when fuel and air mix and burn at the same time.

It is contemplated that the proportion of fuel supplied to the combustor via each of the multiple flow paths may be adjusted to alter operation of engine 30. For example, engine 30 may be operated in a standard emissions mode or a low emissions mode. The proportion of fuel supplied to the combustor via the pilot flow path may be greater in the standard emissions mode than in the low emissions mode. For example, in the low emissions mode of one embodiment, almost none of the fuel supplied to the combustor (e.g., less than 5-10%) is supplied via the pilot flow path. In contrast, in the standard emissions mode of this embodiment, a significant amount of the fuel supplied to the combustor (e.g., upwards of 20-30%) is supplied via the pilot flow path. Unfortunately, supplying a greater proportion of the fuel via the pilot flow path may locally increase a combustion temperature of the fuel (diffusion flames burn hotter than premixed flames), and increase emissions of engine 30. Therefore, it may be desirable to operate engine 30 in the low emissions mode and not in the standard emissions mode (e.g., to reduce an environmental impact of drive system 10).

It is contemplated, however, that engine 30 may operate in the low emissions mode only under certain conditions. For example, engine 30 may operate in the low emissions mode only when an amount of power required by load 15 from engine 30 (hereafter the "engine power requirement of load 15") is greater than a certain amount of power (e.g., a percentage of a rated power of engine 30). As used herein, the rated power of engine 30 is a maximum amount of power that engine 30 may provide. For example, the amount of power that engine 30 may provide may be limited by mechanical features of engine 30, and may vary based on an altitude of engine 30 (which may affect an inlet air density of engine 30) and/or an inlet air temperature of engine 30. Alternatively or additionally, engine 30 may operate in the low emissions mode only under certain environmental conditions. For example, engine 30 may operate in the low emissions mode only when an inlet air temperature of engine 30 is above a certain temperature. Alternatively or additionally, engine 30 may operate in the low emissions mode only under certain other environmental conditions relating to, for example, humidity, air density, and/or fuel type.

Figure 2:
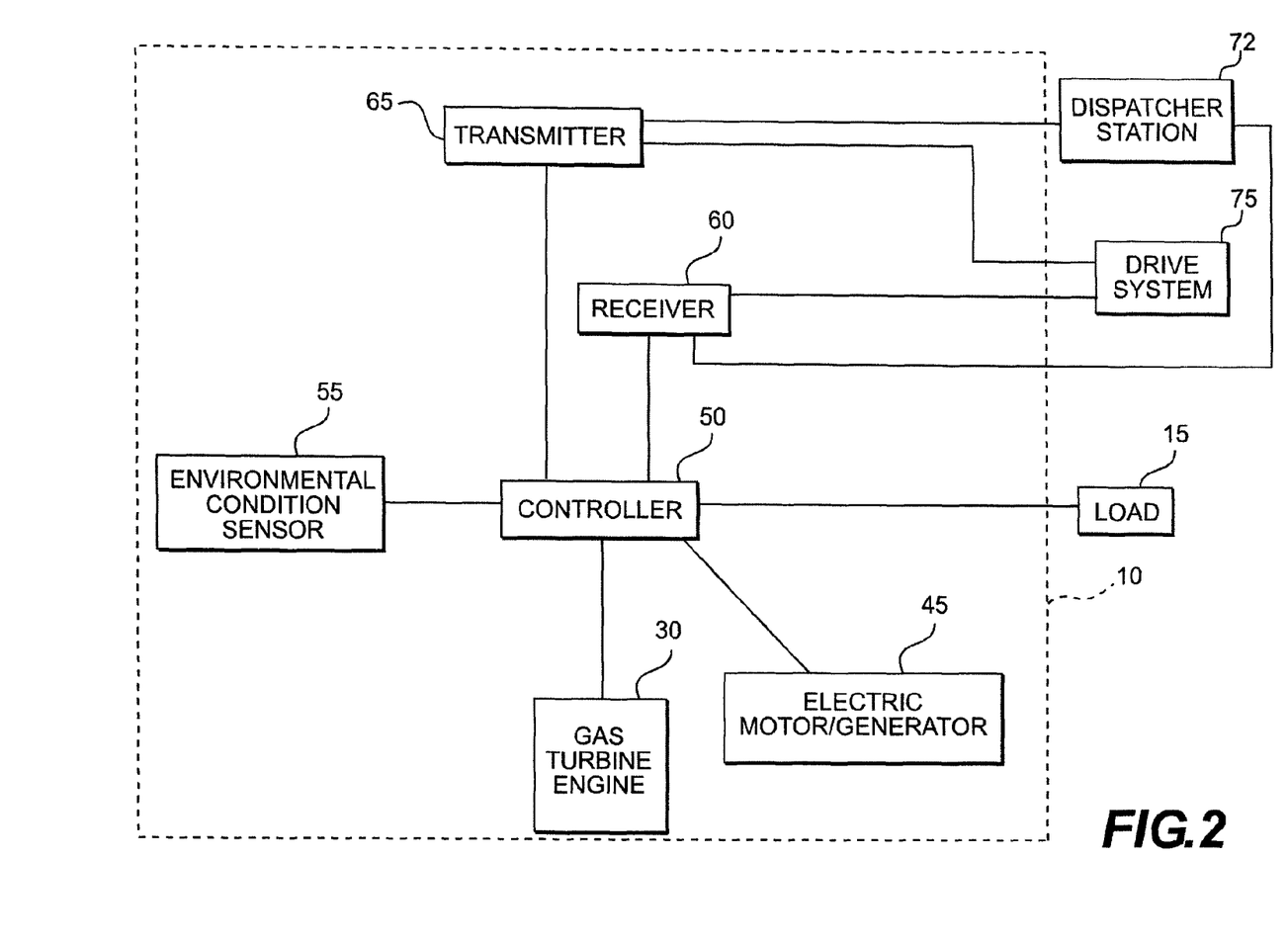
FIG. 2 is a control diagram of the drive system of FIG. 1.

It is contemplated, therefore, that drive system 10 may include components for modifying the engine power requirement of load 15 such that engine 30 can operate in the low emissions mode and/or such that engine 30 can be shut down (i.e., not operated). As illustrated in FIGS. 1 and 2, these components of drive system 10 may include an electric motor/generator 45, a controller 50, an environmental condition sensor 55, a receiver 60, a transmitter 65, and/or another component that may be used to modify the engine power requirement of load 15. As illustrated in FIG. 1, electric motor/generator 45 may be coupled to load 15 by a coupling 70. For example, coupling 70 may include a clutch and/or a gearbox. Alternatively, electric motor/generator 45 may be coupled directly to load 15 by, for example, a drive shaft. In any case, it should be understood that the relative positions of electric motor/generator 45, engine 30, and load 15 need not be as illustrated in FIG. 1. For example, electric motor/generator 45 may be positioned between engine 30 and load 15, and engine 30 may be coupled to load 15 via electric motor/generator 45. Regardless of the relative positions of electric motor/generator 45, engine 30, and load 15, it should also be understood that electric motor/generator 45 may be connected to an electric grid, and may be operated as a motor or as a generator to modify the engine power requirement of load 15.

For example, electric motor/generator 45 may be operated as a motor to decrease the engine power requirement of load 15. Specifically, electric motor/generator 45 may be operated as a motor to provide power to load 15. This power may supplement the power provided to load 15 by engine 30, decreasing the engine power requirement of load 15. In particular, the engine power requirement of load 15 may be decreased by the amount of power provided by electric motor/generator 45.

As another example, electric motor/generator 45 may be operated as a generator to increase the engine power requirement of load 15. Specifically, electric motor/generator 45 may be operated as a generator to receive power from load 15. This power may be drawn from the power provided to load 15 by engine 30, increasing the engine power requirement of load 15. In particular, the engine power requirement of load 15 may be increased by the amount of power received by electric motor/generator 45.

As illustrated in FIG. 2, controller 50, which may include one or more processors (not shown) and one or more memory devices (not shown), may communicate with environmental condition sensor 55, receiver 60, transmitter 65, and/or other components associated with engine 30, load 15, and/or electric motor/generator 45 to determine the engine power requirement of load 15. Based on this determination, controller 50 may modify the engine power requirement of load 15 such that engine 30 can be operated in the low emissions mode and/or such that engine 30 can be shut down, as described below.

Environmental condition sensor 55 may be associated with engine 30, and may be configured to determine an environmental condition that may or may not be conducive to operating engine 30 in the low emissions mode. As used herein, an environmental condition is conducive to operating engine 30 in the low emissions mode if the environmental condition does not prevent engine 30 from operating in the low emissions mode. For example, environmental condition sensor 55 may include a temperature sensor, which may be configured to determine an inlet air temperature of engine 30. Alternatively, environmental condition sensor 55 may include another type of sensor, which may be configured to determine another environmental condition such as, for example, humidity, air density, and/or fuel type. In any case, environmental condition sensor 55 may generate and communicate to controller 50 a signal indicative of the environmental condition.

Receiver 60 may receive, through a communications link, signals from a dispatcher station 72, a drive system 75, and/or another offboard system. For example, dispatcher station 72 may include a facility having computers and/or individuals tasked with controlling the operation of drive system 10, load 15, and/or electric motor/generator 45. And, drive system 75 may include a drive system, which may or may not be equivalent to drive system 10. Receiver 60 may include hardware and/or software that enables receiver 60 to receive the signals through the communications link. The signals may include, for example, satellite, cellular, infrared, radio, and/or other types of wireless signals. Alternatively, the signals may include electrical, optical, and/or other types of wired signals. For example, if load 15 includes centrifugal compressor 20, the signals received from the offboard system may be indicative of a demand for the fluid compressed by centrifugal compressor 20. Alternatively, if load 15 includes a generator, the signals received from the offboard system may be indicative of a demand for electricity. In any case, receiver 60 may generate and communicate to controller 50 a signal indicative of the demand.

Transmitter 65 may transmit, through a communications link, signals to dispatcher station 72, drive system 75, and/or another offboard system. Transmitter 65 may include hardware and/or software that enables transmitter 65 to transmit the signals through the communications link. The signals may include, for example, satellite, cellular, infrared, radio, and/or other types of wireless signals. Alternatively, the signals may include, for example, electrical, optical, and/or other types of wired signals. For example, controller 50 may use transmitter 65 to transmit to the offboard system a signal indicative of the demand, discussed above. Alternatively or additionally, controller 50 may use transmitter 65 to transmit to the offboard system a signal indicative of an amount of additional power needed to meet the demand.

Figure 3:
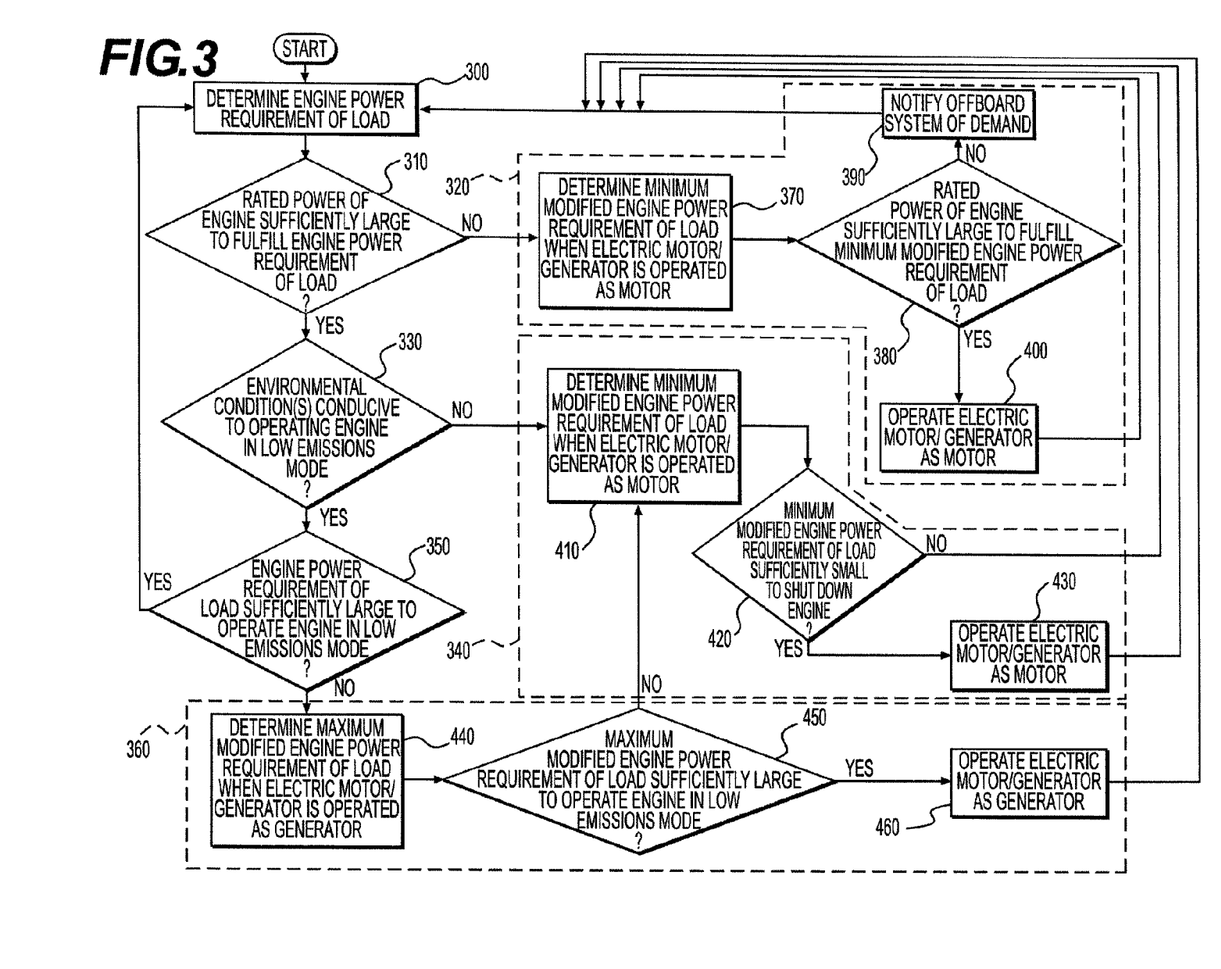
FIG. 3 is a flow chart describing an exemplary method of operating the drive system of FIGS. 1-2.
Figure 4:
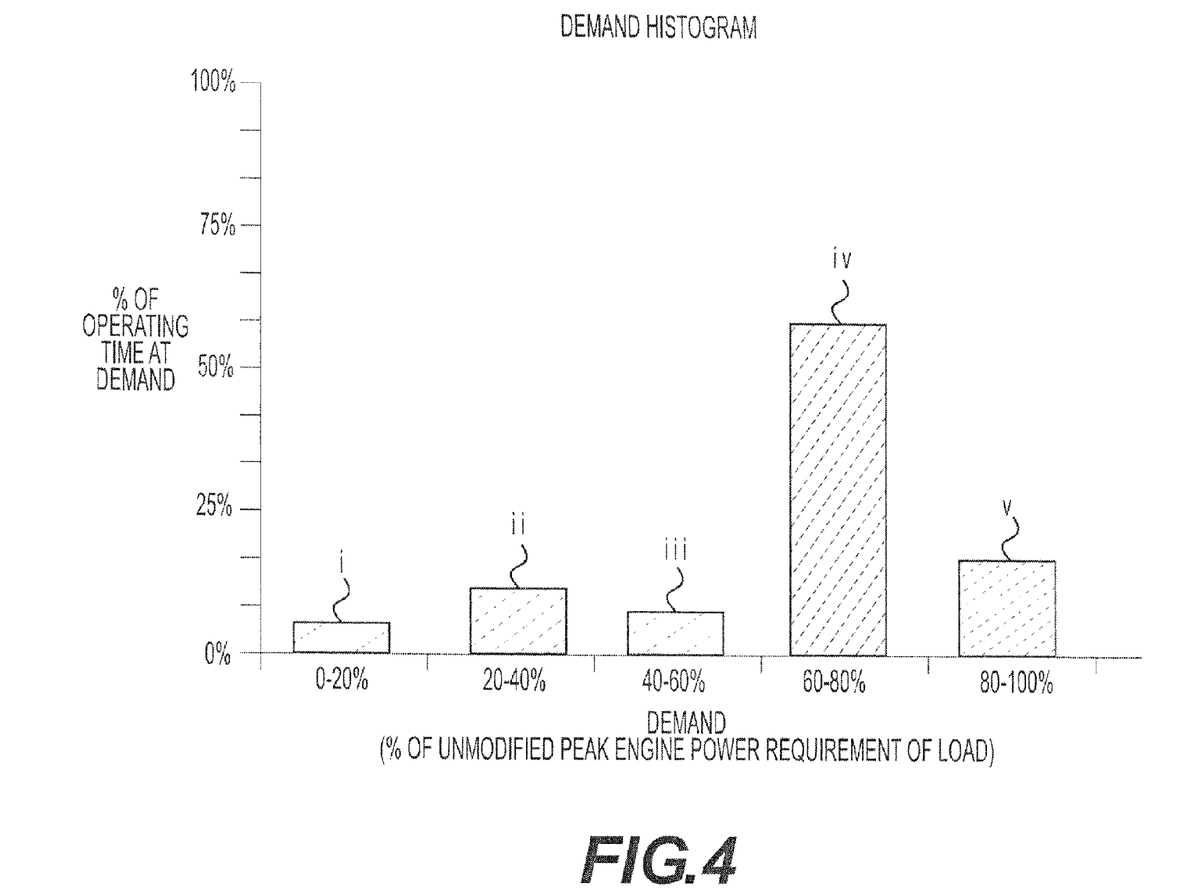
FIG. 4 is an exemplary demand histogram for the drive system of FIGS. 1-3.

FIG. 3 illustrates an exemplary method of operating drive system 10. And FIG. 4 illustrates an exemplary demand histogram for drive system 10. FIGS. 3 and 4 will be discussed in the following section to further illustrate drive system 10 and its operation.

INDUSTRIAL APPLICABILITY

The disclosed system may be applicable to gas turbine engines that are operable in low emissions and standard emissions modes, and that are used to drive loads. The system may increase a proportion of an engine's operating time during which it is operated in the low emissions mode. In particular, the system may use an electric/motor generator to increase and/or decrease the amount of power a load requires from the engine such that the engine can be operated in the low emissions mode and/or such that the engine can be shut down. Operation of the system will now be described.

As illustrated in FIG. 3, drive system 10, and more specifically, controller 50 (referring to FIG. 2), may first determine the engine power requirement of load 15 (the amount of power required by load 15 from engine 30) (step 300). This determination may be based on signals received from dispatcher station 72, drive system 75, and/or another offboard system. In particular, these signals may be received by receiver 60, and may be indicative of a demand. For example, if load 15 includes centrifugal compressor 20, the demand may be a demand for the fluid compressed by centrifugal compressor 20. And, the determination may include a calculation involving the demand for the fluid (e.g., a flow rate and/or a discharge pressure of the fluid), a pressure and/or a temperature of the fluid entering centrifugal compressor 20, a pressure and/or a temperature of the fluid leaving centrifugal compressor 20, an altitude of centrifugal compressor 20, an efficiency of centrifugal compressor 20, and/or another value associated with the engine power requirement of centrifugal compressor 20. Alternatively, if load 15 includes a generator, the demand may be a demand for electricity. And, the determination may include a calculation involving the demand for electricity, the efficiency of the generator, and/or another value associated with the engine power requirement of the generator.

Based on the determined engine power requirement of load 15, controller 50 may use components of drive system 10 to modify the engine power requirement of load 15 such that engine 30 can be operated in the low emissions mode and/or such that engine 30 can be shut down. In particular, controller 50 may determine whether the rated power of engine 30 is sufficiently large to fulfill the engine power requirement of load 15 (step 310). Specifically, controller 50 may compare the engine power requirement of load 15 (as determined during step 300) to the rated power of engine 30. If the engine power requirement of load 15 exceeds the rated power of engine 30, the rated power of engine 30 may not be sufficiently large to fulfill the engine power requirement of load 15, and controller 50 may use components of drive system 10 to decrease the engine power requirement of load 15 (step 320), as described below.

Otherwise, controller 50 may determine whether environmental condition(s) are conducive to operating engine 30 in the low emissions mode (step 330). For example, controller 50 may determine whether the inlet air temperature of engine 30 is sufficiently high to operate engine 30 in the low emissions mode. Specifically, controller 50 may compare the inlet air temperature of engine 30 (as determined by environmental condition sensor 55) to a minimum temperature at which engine 30 may operate in the low emissions mode. If the inlet air temperature of engine 30 fails to exceed this minimum temperature, the environmental condition(s) may not be conducive to operating engine 30 in the low emissions mode. In such a case, controller 50 may use components of drive system 10 to make operation of engine 30 unnecessary (step 340), as described below.

Otherwise, controller 50 may determine whether the engine power requirement of load 15 is sufficiently large to operate engine 30 in the low emissions mode (step 350). Specifically, controller 50 may compare the engine power requirement of load 15 to the rated power of engine 30. If the engine power requirement of load 15 fails to exceed a certain percentage of the rated power of engine 30, the engine power requirement of load 15 may not be sufficiently large to operate engine 30 in the low emissions mode, and controller 50 may use components of drive system 10 to increase the engine power requirement of load 15 (step 360), as described below. Alternatively, controller 50 may use components of drive system 10 to make operation of engine 30 unnecessary (step 340), as described below. If, however, the engine power requirement of load 15 is sufficiently large to operate engine 30 in the low emissions mode, controller 50 may return to step 300 and again determine the engine power requirement of load 15.

Decreasing the engine power requirement of load 15 during step 320 may include sub-steps. In particular, controller 50 may first determine a minimum modified engine power requirement of load 15 when electric motor/generator 45 is operated as a motor (sub-step 370). As previously discussed, the engine power requirement of load 15 may be decreased by the amount of power provided by electric motor/generator 45. Therefore, controller 50 may determine the minimum modified engine power requirement of load 15 by subtracting from the engine power requirement of load 15 (as determined during step 300) a maximum amount of power providable by electric motor/generator 45. It should be noted that this maximum amount of power providable by electric motor/generator 45 may or may not vary based on a rotational speed of load 15. Controller 50 may then determine whether the rated power of engine 30 is sufficiently large to fulfill the minimum modified engine power requirement of load 15 (sub-step 380). Specifically, controller 50 may compare the minimum modified engine power requirement of load 15 to the rated power of engine 30. If the minimum modified engine power requirement of load 15 exceeds the rated power of engine 30, drive system 10 may not be capable of meeting the demand indicated by the signals received by receiver 60. Therefore, controller 50 may use transmitter 65 to notify an offboard system (e.g., dispatcher station 72 or drive system 75) of the demand (sub-step 390). Alternatively or additionally, controller 50 may use transmitter 65 to notify the offboard system of the difference between the minimum modified engine power requirement of load 15 and the rated power of engine 30 (the additional amount of power needed to meet the demand). It is contemplated that drive systems 10 and 75 may then operate jointly to meet the demand indicated by the signals received by receiver 60. Controller 50 may then return to step 300 and again determine the engine power requirement of load 15.

If, however, the minimum modified engine power requirement of load 15 fails to exceed the rated power of engine 30, controller 50 may operate electric motor/generator 45 as a motor to decrease the engine power requirement of load 15 (sub-step 400). In particular, controller 50 may operate electric motor/generator 45 to decrease the engine power requirement of load 15 such that engine 30 can fulfill the decreased engine power requirement of load 15. Controller 50 may then return to step 300 and again determine the engine power requirement of load 15.

Making operation of engine 30 unnecessary during step 340 may also include sub-steps. In particular, controller 50 may first determine a minimum modified engine power requirement of load 15 when electric motor/generator 45 is operated as a motor (sub-step 410). This determination may be equivalent to the determination of sub-step 370. Controller 50 may then determine whether the minimum modified engine power requirement of load 15 is sufficiently small to shut down engine 30 (sub-step 420). Specifically, controller 50 may compare the minimum modified engine power requirement of load 15 to zero. If the minimum modified engine power requirement of load 15 exceeds zero, it may not be possible to shut down engine 30, and controller 50 may return to step 300 and again determine the engine power requirement of load 15.

If, however, the minimum modified engine power requirement of load 15 fails to exceed zero, it may be possible to shut down engine 30, and controller 50 may operate electric motor/generator 45 as a motor to decrease the engine power requirement of load 15 (sub-step 430). In particular, controller 50 may operate electric motor/generator 45 to decrease the engine power requirement of load 15 such that engine 30 can be shut down (i.e., such that operation of engine 30 is unnecessary). Controller 50 may then return to step 300 and again determine the engine power requirement of load 15.

Increasing the engine power requirement of load 15 during step 360 may also include sub-steps. In particular, controller 50 may first determine a maximum modified engine power requirement of load 15 when electric motor/generator 45 is operated as a generator (sub-step 440). As previously discussed, the engine power requirement of load 15 may be increased by the amount of power received by electric motor/generator 45. Therefore, controller 50 may determine the maximum modified engine power requirement of load 15 by adding to the engine power requirement of load 15 (as determined during step 300) a maximum amount of power receivable by electric motor/generator 45. It should be noted that this maximum amount of power receivable by electric motor/generator 45 may or may not vary based on a rotational speed of load 15. Controller 50 may then determine whether the maximum modified engine power requirement of load 15 is sufficiently large to operate engine 30 in the low emissions mode (sub-step 450). Specifically, controller 50 may compare the maximum modified engine power requirement of load 15 to the rated power of engine 30. If the maximum modified engine power requirement of load 15 fails to exceed a certain percentage of the rated power of engine 30, the maximum modified engine power requirement of load 15 may not be sufficiently large to operate engine 30 in the low emissions mode, and controller 50 may proceed to step 340 and use components of drive system 10 to make operation of engine 30 unnecessary, as described above. Alternatively, controller 50 may return to step 300 and again determine the engine power requirement of load 15.

If, however, the maximum modified engine power requirement of load 15 exceeds the certain percentage of the rated power of engine 30, controller 50 may operate electric motor/generator 45 as a generator to increase the engine power requirement of load 15 (sub-step 460). In particular, controller 50 may operate electric motor/generator 45 to increase the engine power requirement of load 15 such that the increased engine power requirement of load 15 allows engine 30 to operate in the low emissions mode. Controller 50 may then return to step 300 and again determine the engine power requirement of load 15.

As previously discussed, controller 50 may return to step 300 after completing steps 320, 340, 350, and/or 360, and again determine the engine power requirement of load 15. Controller 50 may then repeat steps 310-360. During each repetition, it is contemplated that controller 50 may adjust the operation of drive system 10 to minimize the emissions of drive system 10. Specifically, if environmental condition(s) are not conducive to operating engine 30 in the low emissions mode, controller 50 may, during step 340, modify the engine power requirement of load 15 to allow engine 30 to be shut down. If, however, environmental condition(s) are conducive to operating engine 30 in the low emissions mode, controller 50 may, during step 360, modify the engine power requirement of load 15 to allow engine 30 to operate in the low emissions mode.

While the modifications of steps 340 and 360 may instantaneously minimize the emissions of drive system 10, it is contemplated that the modifications of step 320 may over time minimize the emissions of drive system 10. This is because the modifications of step 320 may allow engine 30 to be sized for commonly sized demand periods, rather than for peak demand periods. For example, engine 30 may be sized such that its rated power is approximately 80% of the unmodified peak engine power requirement of load 15, rather than 100% of the unmodified peak engine power requirement of load 15. As illustrated in FIG. 4, this may allow engine 30 to operate in the low emissions mode when the unmodified engine power requirement of load 15 falls within regions iii, iv, and v. Specifically, in region iv, engine 30 may operate in the low emissions mode without modifications to the engine power requirement of load 15. Additionally, in region iii, the modifications of step 360 may allow engine 30 to operate in the low emissions mode. And, in region v, the modifications of step 320 may allow engine 30 to operate in the low emissions mode.

In contrast to an engine 30 that is sized such that its rated power is approximately 80% of the unmodified peak engine power requirement of load 15 (hereafter the "smaller engine 30"), an engine 30 that is sized such that its rated power is approximately 100% of the unmodified peak engine power requirement of load 15 (hereafter the "larger engine 30") may only be able to operate in the low emissions mode when the unmodified engine power requirement of load 15 falls within regions iv and v. Specifically, the larger engine 30 may be able to operate in the low emissions mode in region v without modifications to the engine power requirement of load 15. And, the modifications of step 360 may allow the larger engine 30 to operate in the low emissions mode in region iv.

While it may be possible to operate electric motor/generator 45 instead of the differently sized engines 30 in regions i, ii, and/or iii, it should be noted that this may not compensate for emissions differences between the differently sized engines 30. For example, it should be noted that region iv includes commonly sized demand periods. In other words, the engine power requirement of load 15 falls within region iv most of the time. Thus, the smaller engine 30 may operate in the low emissions mode most of the time without modifications to the power requirement of load 15. In contrast, the larger engine 30 may only be operable in the low emissions mode in region iv with the modifications of step 360. Although operating in the low emissions mode with the modifications of step 360 may be preferable to operating in the standard emissions mode, it is contemplated that operating in the low emissions mode without modifications to the power requirement of load 15 may produce less emissions than operating in the low emissions mode with the modifications of step 360. Therefore, the emissions of drive system 10 may over time be minimized when engine 30 is sized for commonly sized demand periods, rather than for peak demand periods.

In addition, it is contemplated that the modifications of step 320 may minimize the emissions of multiple drive systems operating jointly to meet a demand. Specifically, controller 50 may, during step 320, modify the engine power requirement of load 15 to allow drive system 10 to meet the demand while operating engine 30 in the low emissions mode. In doing so, controller 50 may make operation of an engine of another drive system 75 unnecessary, preventing the engine of drive system 75 from operating in the standard emissions mode.

It is also contemplated that the modifications of steps 320, 340, and 360 may reduce operating costs associated with drive system 10. In particular, the modifications may minimize fuel costs associated with drive system 10. Specifically, it is contemplated that allowing engine 30 to operate in the low emissions mode may reduce a fuel consumption of engine 30. This is because engine 30 may operate more efficiently in the low emissions mode. Also, allowing engine 30 to be shut down under certain conditions may make it possible to take advantage of cost differences between electricity and fuel. For example, controller 50 may be configured to proceed to step 340 and operate electric motor/generator 45 as a motor whenever electricity costs are low relative to fuel costs. This may reduce the fuel consumption of engine 30 and increase the electricity consumption of electric motor/generator 45, thereby minimizing the total fuel and electricity costs. Alternatively, controller 50 may be configured to proceed to step 360 and operate electric motor/generator 45 as a generator whenever electricity costs are high relative to fuel costs. This may increase the fuel consumption of engine 30 and increase the electricity production of electric motor/generator 45, thereby minimizing the total fuel and electricity costs. In yet another alternative, it is contemplated that the modifications of steps 320, 340, and 360 may minimize emissions costs associated with drive system 10. For example, these costs may include costs associated with purchasing offsetting emissions credits. And, as previously discussed, the modifications of steps 320, 340, and 360 may minimize the emissions of drive system 10.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method of operating a drive system for a load, the drive system including an electric motor/generator and a gas turbine engine, the engine including a combustor, and main and pilot flow paths via which fuel is supplied to the combustor, the engine being operable in a low emissions mode and a standard emissions mode, a proportion of the fuel that is supplied to the combustor via the pilot flow path being greater in the standard emissions mode than in the low emissions mode, the method comprising:
    determining whether an environmental condition exceeds a threshold to operate the engine in the low emissions mode, wherein the environmental condition comprises at least one of inlet air temperature, humidity, air density, and fuel type; and
    operating the electric motor/generator as a motor if the environmental condition fails to exceed the threshold to operate the engine in the low emissions mode.

2. The method of claim 1, wherein determining whether the environmental condition exceeds a threshold to operate the engine in the low emissions mode includes:
    determining an inlet air temperature of the engine;
    determining whether the inlet air temperature exceeds a threshold to operate the engine in the low emissions mode;
    determining that the environmental condition exceeds the threshold to operate the engine in the low emissions mode if the inlet air temperature exceeds the threshold to operate the engine in the low emissions mode; and
    determining that the environmental condition fails to exceed the threshold to operate the engine in the low emissions mode if the inlet air temperature fails to exceed a threshold to operate the engine in the low emissions mode.

3. The method of claim 1, further including:
    determining a minimum modified engine power requirement of the load when the electric motor/generator is operated as a motor; and
    determining whether the minimum modified engine power requirement exceeds a threshold to enable engine shut down, wherein the electric motor/generator is only operated as a motor if the minimum modified engine power requirement exceeds the threshold to enable engine shut down.

4. The method of claim 1, further including:
    determining an engine power requirement of the load;
    determining whether the engine power requirement of the load exceeds a threshold percentage of rated power to operate the engine in the low emissions mode; and
    operating the electric motor/generator if:
        the environmental condition exceeds the threshold to operate the engine in the low emissions mode; and
        the engine power requirement of the load fails to exceed the threshold percentage of rated power to operate the engine in the low emissions mode.

5. The method of claim 4, further including:
    determining a maximum modified engine power requirement of the load when the electric motor/generator is operated as a generator; and
    determining whether the maximum modified engine power requirement exceeds a threshold percentage of rated power to operate the engine in the low emissions mode, wherein the electric motor/generator is operated as a generator if the maximum modified engine power requirement exceeds the threshold percentage of rated power to operate the engine in the low emissions mode.

6. The method of claim 4, further including:
determining a minimum modified engine power requirement of the load when the electric motor/generator is operated as a motor; and
determining whether the minimum modified engine power requirement exceeds a threshold to enable engine shut down, wherein the electric motor/generator is operated as a motor if the minimum modified engine power requirement exceeds the threshold to enable engine shut down.

7. The method of claim 1, further including:
determining an engine power requirement of the load;
determining whether a rated power of the engine exceeds the engine power requirement of the load; and
operating the electric motor/generator as a motor if the rated power of the engine fails to exceed the engine power requirement of the load.

8. The method of claim 7, further including:
determining a minimum modified engine power requirement of the load when the electric motor/generator is operated as a motor;
determining whether the rated power of the engine exceeds the minimum modified engine power requirement; and
notifying an offboard system if the rated power of the engine fails to exceed the minimum modified engine power requirement.

9. A method of operating a drive system for a load, the drive system including an electric motor/generator and a gas turbine engine, the engine including a combustor, and main and pilot flow paths via which fuel is supplied to the combustor, the engine being operable in a low emissions mode and a standard emissions mode, a proportion of the fuel that is supplied to the combustor via the pilot flow path being greater in the standard emissions mode than in the low emissions mode, the method comprising:
determining an engine power requirement of the load;
determining whether the engine power requirement of the load exceeds a threshold percentage of rated power to operate the engine in the low emissions mode; and
operating the electric motor/generator if the engine power requirement of the load fails to exceed the threshold percentage of rated power to operate the engine in the low emissions mode.

10. The method of claim 9, further including:
determining a maximum modified engine power requirement of the load when the electric motor/generator is operated as a generator; and
determining whether the maximum modified engine power requirement exceeds a threshold percentage of rated power to operate the engine in the low emissions mode, wherein the electric motor/generator is operated as a generator if the maximum modified engine power requirement exceeds the threshold percentage of rated power to operate the engine in the low emissions mode.

11. The method of claim 9, further including:
determining a minimum modified engine power requirement of the load when the electric motor/generator is operated as a motor; and
determining whether the minimum modified engine power requirement exceeds a threshold to enable engine shut down, wherein the electric motor/generator is operated as a motor if the minimum modified engine power requirement exceeds the threshold to enable engine shut down.

12. The method of claim 9, further including:
determining whether a rated power of the engine exceeds the engine power requirement of the load; and
operating the electric motor/generator as a motor if the rated power of the engine fails to exceed the engine power requirement of the load.

13. The method of claim 12, further including:
determining a minimum modified engine power requirement of the load when the electric motor/generator is operated as a motor;
determining whether the rated power of the engine exceeds the minimum modified engine power requirement; and
notifying an offboard system if the rated power of the engine fails to exceed the minimum modified engine power requirement.

14. The method of claim 9, further including determining whether an environmental condition exceeds a threshold to operate the engine in the low emissions mode, wherein:
the environmental condition comprises at least one of inlet air temperature, humidity, air density, and fuel type; and
the electric motor/generator is operated as a motor if the environmental condition fails to exceed the threshold to operate the engine in the low emissions mode.

15. The method of claim 14, wherein determining whether the environmental condition exceeds a threshold to operate the engine in the low emissions mode includes:
determining an inlet air temperature of the engine;
determining whether the inlet air temperature exceeds a threshold to operate the engine in the low emissions mode;
determining that the environmental condition exceeds the threshold to operate the engine in the low emissions mode if the inlet air temperature exceeds the threshold to operate the engine in the low emissions mode; and
determining that the environmental condition fails to exceed the threshold to operate the engine in the low emissions mode if the inlet air temperature fails to exceed the threshold to operate the engine in the low emissions mode.

16. The method of claim 14, further including:
determining a minimum modified engine power requirement of the load when the electric motor/generator is operated as a motor; and
determining whether the minimum modified engine power requirement exceeds a threshold to enable engine shut down, wherein the electric motor/generator is only operated if the minimum modified engine power requirement exceeds the threshold to enable engine shut down.

* * * * *

UNITED STATES PATENT AND TRADEMARK OFFICE
CERTIFICATE OF CORRECTION

| | | |
|---|---|---|
| PATENT NO. | : 8,468,835 B2 | Page 1 of 1 |
| APPLICATION NO. | : 12/413088 | |
| DATED | : June 25, 2013 | |
| INVENTOR(S) | : DeMoss et al. | |

It is certified that error appears in the above-identified patent and that said Letters Patent is hereby corrected as shown below:

IN THE CLAIMS

Column 12, line 58, below Claim 16 insert -- 17. A method of operating a drive system for a load, the drive system including an electric motor/generator and a gas turbine engine, the engine including a combustor, and main and pilot flow paths via which fuel is supplied to the combustor, the engine being operable in a low emissions mode and a standard emissions mode, a proportion of the fuel that is supplied to the combustor via the pilot flow path being greater in the standard emissions mode than in the low emissions mode, the method comprising:
determining whether an environmental condition is conducive to operating the engine in the low emissions mode, wherein determining whether the environmental condition is conducive to operating the engine in the low emissions mode comprises:
determining an inlet air temperature of the engine;
determining whether the inlet air temperature is sufficiently high to operate the engine in the low emissions mode;
determining that the environmental condition is conducive to operating the engine in the low emissions mode if the inlet air temperature is sufficiently high to operate the engine in the low emissions mode; and
determining that the environmental condition is not conducive to operating the engine in the low emissions mode if the inlet air temperature is not sufficiently high to operate the engine in the low emissions mode; and
operating the electric motor/generator as a motor if the environmental condition is not conducive to operating the engine in the low emissions mode. --.

Signed and Sealed this
Eleventh Day of August, 2015

Michelle K. Lee
*Director of the United States Patent and Trademark Office*